(12) United States Patent
Blanche et al.

(10) Patent No.: US 12,704,723 B1
(45) Date of Patent: Aug. 11, 2026

(54) HOMOGENOUS LIGHT INTENSITY OUTPUT FROM A WAVEGUIDE COMBINER

(71) Applicant: Amazon Technologies, Inc., Seattle, WA (US)

(72) Inventors: Pierre-Alexandre Blanche, Tucson, AZ (US); Benjamin David Chrysler, Tucson, AZ (US); Arkady Bablumyan, Escondido, CA (US)

(73) Assignee: Amazon Technologies, Inc., Seattle, WA (US)

( * ) Notice: Subject to any disclaimer, the term of this patent is extended or adjusted under 35 U.S.C. 154(b) by 346 days.

(21) Appl. No.: 18/216,882

(22) Filed: Jun. 30, 2023

(51) Int. Cl.
*G02B 27/01* (2006.01)
*G03H 1/02* (2006.01)

(52) U.S. Cl.
CPC ....... *G02B 27/0172* (2013.01); *G03H 1/0244* (2013.01); *G03H 1/0248* (2013.01); *G02B 2027/0174* (2013.01)

(58) Field of Classification Search
CPC ........ G02B 27/0172; G02B 2027/0174; G02B 2027/0178; G02B 27/1086; G02B 5/32
See application file for complete search history.

(56) References Cited

U.S. PATENT DOCUMENTS

2019/0056593 A1* 2/2019 Bablumyan ............ G02B 27/44
2020/0225498 A1 7/2020 Potnis et al.
2020/0341280 A1* 10/2020 Bablumyan .............. G02B 5/32
2020/0409145 A1* 12/2020 Bablumyan ........ G02B 27/0081
2022/0187765 A1* 6/2022 Bablumyan .............. G02B 5/32
2022/0373971 A1* 11/2022 Bablumyan ........ G02B 27/0994
2024/0272361 A1* 8/2024 Sharlin .................... G02B 6/26

OTHER PUBLICATIONS

Blanche et al., “Holography for automotive applications: from HUD to LIDAR,” Proceedings of SPIE 10757, Optical Data Storage 2018: Industrial Optical Devices and Systems, 107570B (Sep. 14, 2018); San Diego, US; doi: 10.1117/12.2323771. Downloaded From: https://www.spiedigitallibrary.org/conference-proceedings-of-spie on Apr. 5, 2023, 11 pages.

* cited by examiner

*Primary Examiner* — Van N Chow
(74) *Attorney, Agent, or Firm* — Kilpatrick Townsend & Stockton LLP

(57) ABSTRACT

Techniques for an optical waveguide with homogenous light intensity output are described herein. In an example, an optical waveguide system includes an optical waveguide substrate and a first holographic layer coupled to the optical waveguide substrate and configured to inject light into the optical waveguide substrate as injected light. The optical waveguide system also includes a second holographic layer coupled to the optical waveguide substrate and configured to receive the injected light and output the injected light as output lights in a direction. The second holographic layer is characterized by a varying diffraction efficiency and the output lights have a homogenous intensity at a distance from the second holographic layer.

17 Claims, 15 Drawing Sheets

HOMOGENOUS LIGHT INTENSITY OUTPUT FROM A WAVEGUIDE COMBINER

BACKGROUND

Image displays have been utilized in different mixed reality systems such as augmented reality systems that include near eye displays and heads-up displays. In a mixed reality system, an image can be displayed to a user from a light projector onto a light transparent combiner that allows the user to also view the real world.

BRIEF DESCRIPTION OF THE DRAWINGS

Various embodiments in accordance with the present disclosure will be described with reference to the drawings, in which.

DETAILED DESCRIPTION

Figure 1:
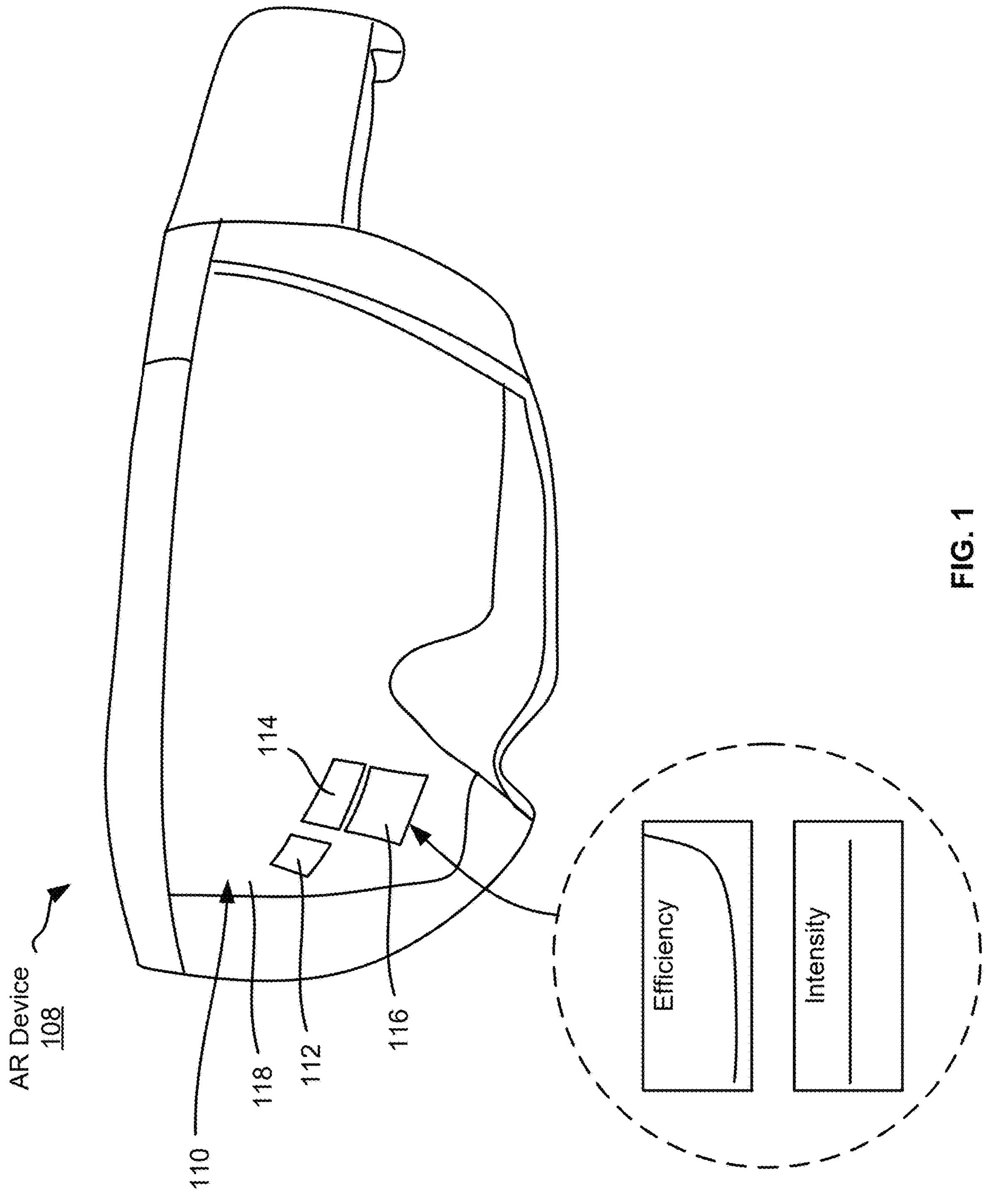
FIG. 1 illustrates an example of a mixed reality device that implements an optical waveguide with multiple holographic layers in accordance with an embodiment of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, an optical waveguide that outputs light having a homogenous light intensity. In an example, the optical waveguide can include an optical waveguide substrate and at least one holographic layer (e.g., a redirection holographic layer or an extraction holographic layer) that has a varying diffraction efficiency. The holographic layer can have multiple extraction sites from which light is output. The diffraction efficiency of one extraction site can be different than that of another extraction side. In an example, the varying diffraction efficiency can be preset based on a location of an extraction site of the holographic layer relative to the locations of the other extraction sites (e.g., based on where the extraction site is in the holographic layer, such as its distance to the first extraction site and/or the number of bounces before the light reaches the extraction sites) and on a maximum diffraction efficiency of the optical waveguide substrate. The presetting of the diffraction efficiency per extraction site can be determined using an equation that indicates the diffraction efficiency value to use. The holographic layer can be formed such that it is characterized by the varying diffraction efficiency, such that each of its extraction site has a particular diffraction efficiency value. The varying diffraction efficiency can result in the output light having a homogenous intensity across the extraction sites of the holographic layer.

To illustrate, consider an example of an augmented reality device that implements an optical system of the present disclosure. The augmented reality device can be glasses that include a light projector and a waveguide substrate. The waveguide substrate is coupled to an injection holographic layer, a redirection holographic layer, and an extraction holographic layer. The injection holographic layer receives light incident from the light projector. The injection holographic layer injects the light into the waveguide substrate as injected light that propagates in the waveguide substrate until it reaches the redirection holographic layer. The redirection holographic layer can be characterized by a varying diffraction efficiency defined based on a non-linear function expressed as $$\eta(n) = \frac{1}{\frac{1}{\eta_{max}} + N - n},$$

where "n" corresponds to an n-th extraction site, "N" represents a total number of extraction sites, and "$\eta_{max}$" represents the maximum diffraction efficiency of the optical waveguide substrate. The redirection holographic layer redirects the injected light as redirected light rays along a direction towards the extraction holographic layer. Because of the varying diffraction efficiency, the redirected light rays have a homogenous light intensity at a first distance from the redirection holographic layer (e.g., at an output surface thereof or at a few centimeters away from such an output surface). The redirected light rays reach the extraction holographic layer. The extraction holographic layer can also be characterized by a diffraction efficiency that varies across a length of the extraction holographic layer. The extraction holographic layer extracts the redirected light rays as extracted light rays that have a homogenous light intensity due to the varying diffraction efficiency.

Embodiments of the present disclosure provide several technical advantages over conventional optical waveguide systems. For instance, conventional near-eye displays (NEDs) may suffer from low eye box uniformity, meaning that an intensity of light is not uniform across the eye box. By using a holographic layer (e.g., an extraction holographic layer) with a varying diffraction efficiency, the intensity of light that is output can be homogenous, thereby improving the eye box uniformity. In addition, the varying diffraction efficiency can result in less energy being lost in the waveguide.

As used herein, the terms "light" and "optical" are used in their customary ordinary meaning and refer to electromagnetic wave having a wavelength within the visible region of the optical spectrum and, optionally, within a region that neighbors the visible region (a flanking region). Also as used herein, the term "hologram" is used in its customary ordinary meaning and refers to a diffraction pattern-produced by a spatially split coherent beam of radiation (such as a laser beam) in a layer of an optical material. The term "holographic layer" refers to a layer of material containing a hologram recorded therein (in a body or thickness of the layer) and/or as a surface modulation (surface relief) of such a layer.

FIG. 1 illustrates an example of a mixed reality device that implements homogenous light intensity output in accordance with an embodiment of the disclosure. In the example of FIG. 1, the mixed reality device is illustrated as an augmented reality (AR) device 108. However, other types of mixed reality devices are likewise possible, such as heads up displays (HUDs), holographic devices, and the like. Generally, a mixed reality device enables combining images from different sources via an optical waveguide combiner. One source can be the real world, whereby these images are real-world images. Another source can be a virtual world, whereby these images are virtual (or digital) images. A waveguide combiner projects virtual images and allow a viewer to see through the real world for AR and heads-up display (HUD) applications. The waveguide combiner offers the possibility to extend the eye box without sacrificing the field of view. The eye box is the region where the viewer sees the image, and the field of view is the angular extent (size) of the image.

Referring to FIG. 1, the AR device 108 (e.g., its optical combiner) can combine the real-world images with the virtual images. The real-world images can be perceived through a see-through lens of the AR device 108. The virtual images can be formed based on light emission from a light projector.

The AR device 108 may include an optical waveguide system 110. The optical waveguide system 110 (or at least the optical waveguide) can span the entirety of a face shield of the AR device 108 or a portion thereof. In an example, the optical waveguide system 110 includes an optical waveguide substrate 118 that propagates a light beam between a light injection surface and a light extraction surface.

In an example, the optical waveguide system 110 includes an injection holographic layer 112 coupled to the optical waveguide substrate 118. The injection holographic layer 112 injects the light beam into the optical waveguide substrate 118 as injected light. The injected light can propagate within the optical waveguide substrate until reaching a redirection holographic layer 114 coupled to the optical waveguide substrate 118. The redirection holographic layer 114 has an input surface that receives the injected light. The redirection holographic layer 114 redirects the injected light as redirected light propagating from an output surface of the redirection holographic layer 114 in a first direction (e.g., y direction). The redirection holographic layer 114 can be characterized by a diffraction efficiency that varies across the output surface. As a result, the redirected light can have a homogenous intensity across the output surface of the redirection holographic layer 114.

The redirected light can propagate within the optical waveguide substrate 118 until reaching an extraction holographic layer 116 coupled to the optical waveguide substrate. The extraction holographic layer 116 can receive the redirected light at an input surface and extract the redirected light as extracted light propagating from an output surface in a second direction (e.g., z direction). As illustrated by the plots in FIG. 1, the extraction holographic layer 116 can also be characterized by a diffraction efficiency that varies across the output surface. As a result, the extracted light can have a homogenous intensity across the output surface of the extraction holographic layer 116.

Figure 2:
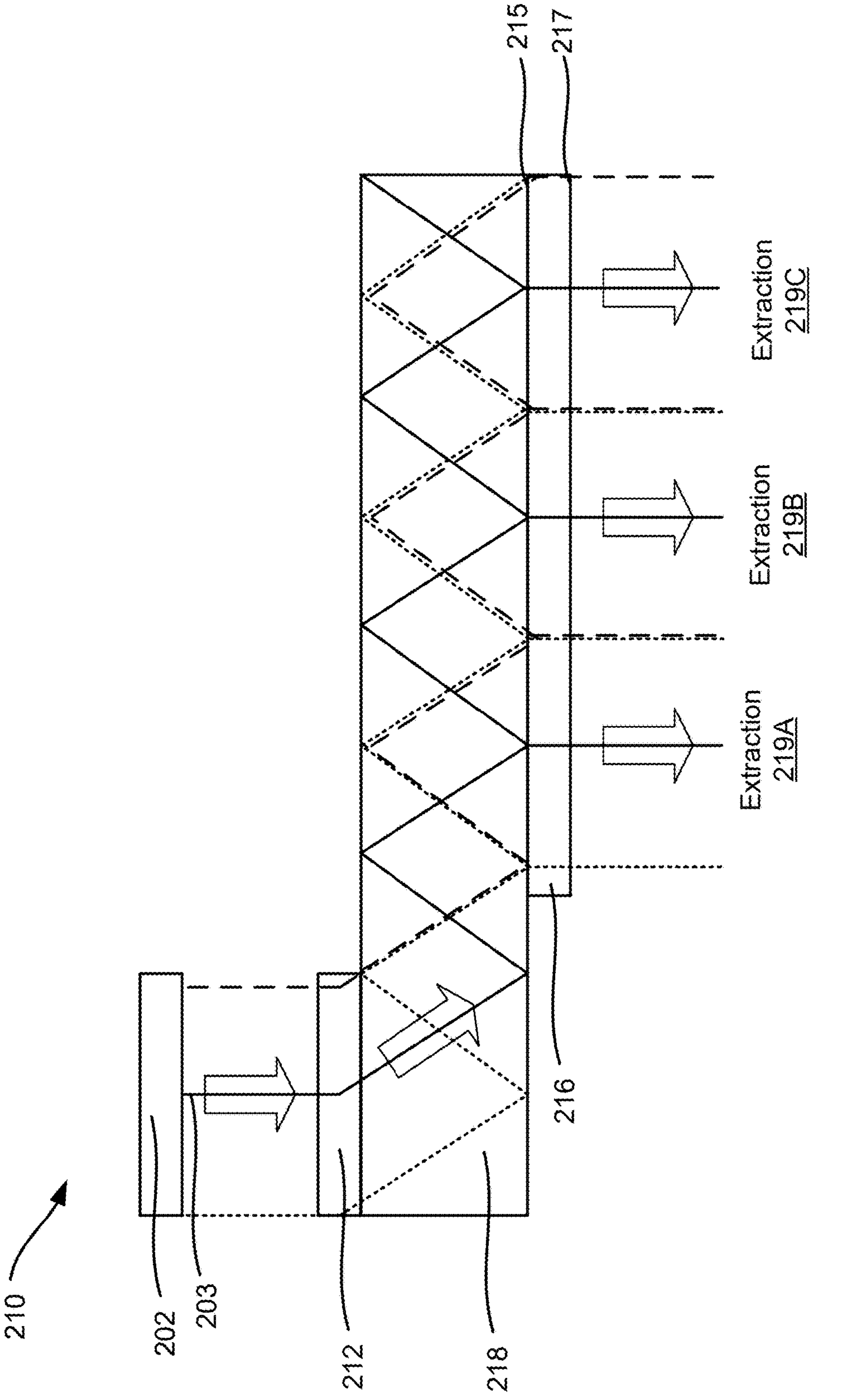
FIG. 2 illustrates homogenous light intensity extraction from an optical waveguide system in accordance with an embodiment of the disclosure.

FIG. 2 illustrates homogenous light intensity extraction from an optical waveguide system 210 in accordance with an embodiment of the disclosure. A light source 202 projects light 203 towards an injection holographic layer 212 that is coupled to an optical waveguide substrate 218. The light 203 represents an image (e.g., virtual imagery). The injection holographic layer 212 injects the light 203 into the optical waveguide substrate 218, where the injected light propagates by total internal reflection (TIR) until reaching an extraction holographic layer 216 that is coupled to the optical waveguide substrate 218. The extraction holographic layer 216 includes an input surface 215 that receives the injected light and an output surface 217 from which extracted light from the extraction holographic layer 216 propagates.

In an example, the light 203 may be extracted multiple times along the extraction holographic layer 216. The diffraction efficiency of the extraction holographic layer 216 can vary across the output surface 217 such that the extracted light has a homogeneous intensity across the output surface 217. As illustrated in FIG. 2, the extraction holographic layer 216 may include three regions that are each associated with an extraction 219A, an extraction 219B, and an extraction 219C. Each of to the regions output light that propagates from a particular region. The extractions 219A-219C can each represent an eye box portion in which the full image is viewable (e.g., each extraction 219A, 219B, or 219C correspond to a pupil location within the eye box).

Each region can represent an extraction site from which a portion of the light received at the input surface 215 is extracted and can correspond to a pupil location within an eye box. As the light bounces and is extracted out, the intensity of the light diminishes. As such, the first received light at the first region (or the first extraction site, shown to the left of the extraction holographic layer 216) has larger intensity than the second received light at the second region (or the second extraction site, shown in the middle of the extraction holographic layer 216). In turn, the second received light has larger intensity than the third received light at the third region (or the third extraction site, shown to the right of the extraction holographic layer 216). Hence, if the diffraction efficiency is the same for each of the three regions, the extraction 219A represents light that has a higher intensity than the extraction 219B that, in turn, has a higher intensity than the extraction 219C. Each extraction 219A, 219B, and 219C presents the same image, but the light intensity of the image varies across the eye box (e.g., the image viewable through the first region has a higher intensity (e.g., brightness in luminosity) than that same image viewable through the second region, and the image viewable through the second region has a higher intensity than that same image viewable through the third region).

To improve the extractions such that the light intensity becomes homogeneous across the eye box (e.g., the image's brightness in luminosity becomes the same regardless of the pupil location), the diffraction efficiency of the extraction holographic layer 216 can vary. In particular, each region can have a constant diffraction efficiency value, but the diffraction efficiency values of the regions can be different from each other. Generally, the diffraction efficiency of a region increases with the number of bounces or with an increase to a distance to the first region. This dependency between the value of the diffraction efficiency to use for a region and the number of bounces or distance can be expressed in an equation. The equation may be non-linear and defined such that the light intensity is homogenous across the regions. For the homogeneity to hold true, the equation may also include a maximum diffraction efficiency, as further described herein next.

In an example of the varying diffraction efficiency of the extraction holographic layer 216, the diffraction efficiency value of each region can be based on a location of the region and a maximum diffraction efficiency of the optical waveguide substrate 218. For instance, the diffraction efficiency value for a region may be based on a number of bounces of the injected light prior to being output from the region and the maximum diffraction efficiency of the optical waveguide substrate 218. In addition, the diffraction efficiency value may be based on a total number of bounces of the injected light within the optical waveguide substrate 218. Alternatively, the diffraction efficiency value of a region may be based on a distance between the region and another region and on the maximum diffraction efficiency of the optical waveguide substrate 218. The extraction holographic layer 216 can define an eye box, and the diffraction efficiency value of a region may be based on a width of the eye box (e.g., the distance between the extraction 219A and the extraction 219C). So, within each region, the diffraction efficiency value can be constant across the regions, but the diffraction efficiency values can differ between regions.

As a particular example, $I_{in}(n)$ is the intensity incident to the n extraction site, $I_{out}(n)$ is the intensity diffracted at the "n" extraction site, or the distance in the extraction holographic layer 216, "N" is the number of extractions or the total length of the extraction holographic layer 216, and $I_{in}(N+1)$ is the reminder of intensity left unextracted inside the optical waveguide substrate 218 at the end of the extraction holographic layer 216. Since $I_{out}(n)$ is to be constant for any n, by definition, the efficiency η at n is:

$$\eta(n)=I_{out}(n)/I_{in}(n) \tag{1}$$

At the end of the waveguide, the energy left propagating is equal to:

$$I_{in}(N+1)=I_{in}(N)-I_{out} \tag{2}$$

To extract the most possible amount of energy at the end of the optical waveguide substrate 218, the largest possible efficiency at the end of the extraction holographic layer N can be used and is expressed as:

$$\eta(N)=\frac{I_{out}(N)}{I_{in}(N)}=\eta_{max} \tag{3}$$

Using equations 1, 2 and 3, it can be shown:

$$I_{in}(N+1)=I_{out}\left(\frac{1}{\eta_{max}}-1\right) \tag{4}$$

The remainder of the energy in the optical waveguide substrate 218 is equal to the injected energy minus the sum of all extracted energy:

$$I_{in}(N+1)=I_{in}(1)-NI_{out} \tag{5}$$

Or, in all generalities, from any location n, the remainder energy is equal to the energy at that location $I_{in}(n)$, minus what is extracted during the N−n+1 extractions that are left to propagate:

$$I_{in}(N+1)=I_{in}(n)-(N-n+1)I_{out} \tag{6}$$

Equaling equations 4 and 6, it is shown:

$$I_{out}\left(\frac{1}{\eta_{max}}-1\right)=I_{in}(n)-(N-n+1)I_{out} \tag{7}$$

Dividing by $I_{out}$ and redistributing the terms:

$$\frac{I_{in}(n)}{I_{out}}=\frac{1}{\eta_{max}}-1+N-n+1 \tag{8}$$

Using the equation 1 for the definition of the diffraction efficiency ($I_{out}/I_{in}(n)$):

$$\eta(n)=\frac{1}{\frac{1}{\eta_{max}}+N-n} \tag{9}$$

Equation (9) can be used to trace the shape of the gradient and equation (1) can be used to verify that the intensity is constant over the length of the extraction holographic layer 216.

Figure 3:
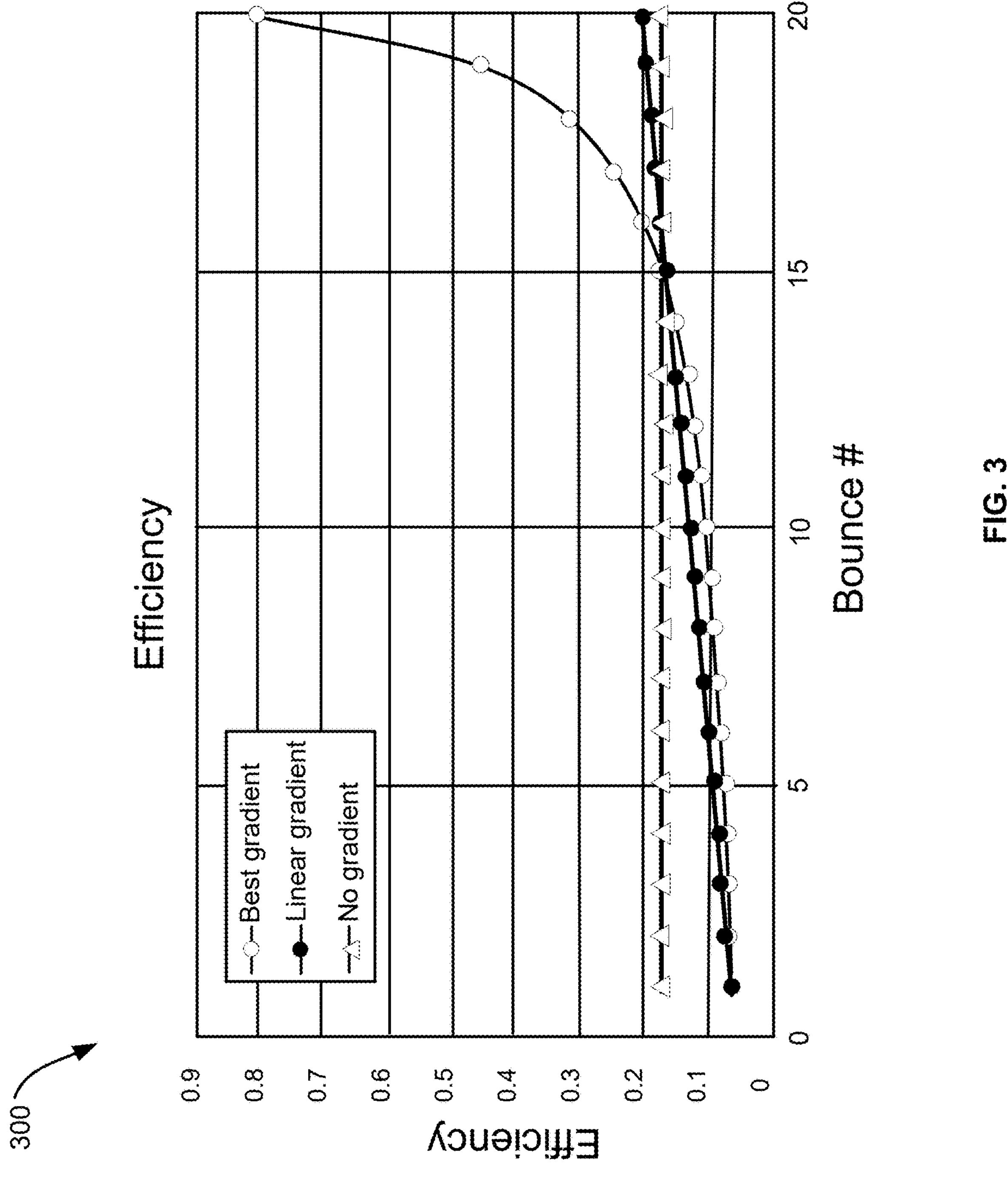
FIG. 3 illustrates an example plot of diffraction efficiency relative to distance propagated in a waveguide substrate in accordance with an embodiment of the disclosure.

FIG. 3 illustrates an example plot 300 of diffraction efficiency relative to distance propagated in a waveguide substrate in accordance with an embodiment of the disclosure. The plot 300 shows the diffraction efficiency values, on the vertical axis, for regions of a holographic layer (e.g., redirection holographic layer 114 or extraction holographic layer 116 in FIG. 1). Each region corresponds to a bounce number on the horizontal axis. The "best gradient" represents the diffraction efficiency value determined from equation (9), which is compared to a diffraction efficiency using a linear gradient and a diffraction efficiency using no gradient. FIG. 3 corresponds to one-dimensional pupil expansion (e.g., no redirection holographic layer is implemented) with a maximum diffraction efficiency of 80%.

As is shown in the plot 300, the best gradient varies in a non-linear manner based on the number of bounces of injected light prior to being output from the corresponding region of the holographic layer. Whereas the diffraction efficiency values for the linear diffraction gradient and no gradient are between about 0.05 and 0.2 for each bounce up to twenty bounces, the diffraction efficiency values for the best gradient begin around 0.05 for one bounce and increase to around 0.8 at twenty bounces.

Figure 4:
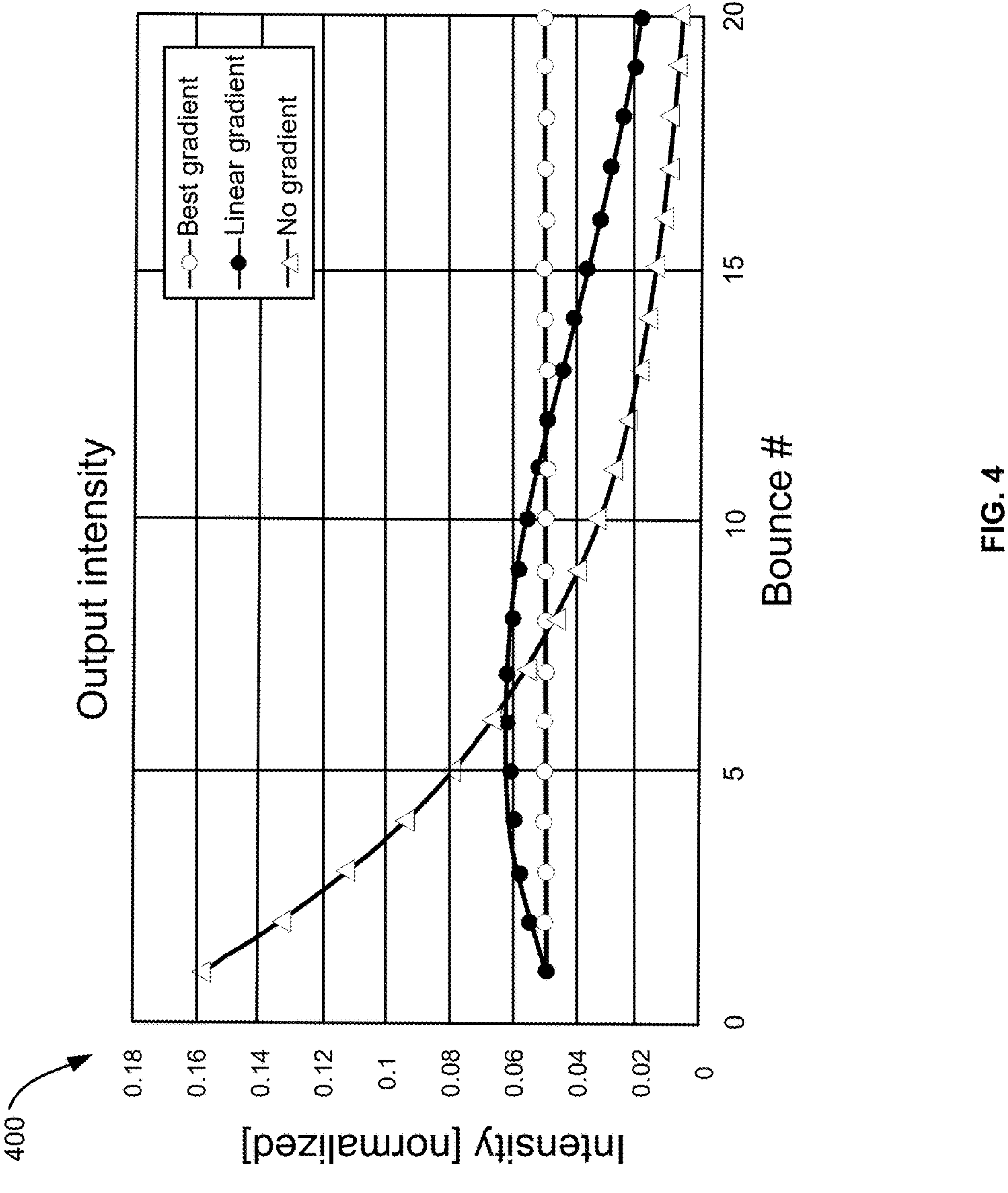
FIG. 4 illustrates an example plot of intensity relative to distance propagated in a waveguide substrate in accordance with an embodiment of the disclosure.

FIG. 4 illustrates an example plot 400 of intensity relative to distance propagated in a waveguide substrate in accordance with an embodiment of the disclosure. The intensity corresponds to an output light intensity at an eye box for different diffraction gradients applied to an extraction holographic layer (e.g., extraction holographic layer 116 in FIG. 1). The "best gradient" represents the intensity resulting from using diffraction efficiency values determined from equation (9), which is compared to an intensity resulting from a diffraction efficiency using a linear gradient and an intensity resulting from a diffraction efficiency using no gradient. Each of the plotted intensities correspond to varying the diffraction efficiency per the corresponding one of the three methods described in FIG. 3.

As is shown in plot 400, using the best gradient results in a homogenous intensity across the length of the extraction holographic layer. That is, the intensity is 0.05 regardless of the number of bounces of the injected light prior to being output (e.g., regardless of the extraction site). However, the light intensities for both the linear gradient and the no gradient vary depending on the number of bounces, and result in an intensity less than 0.02 at twenty bounces. So, using the best gradient results in the best eye box uniformity. That is because, with the "best gradient" technique described in the present disclosure, the maximum efficiency of the waveguide substrate is accounted for (e.g., see $\eta_{max}$ in equation (9)).

FIG. 4 corresponds to one-dimensional pupil expansion with a maximum efficiency of 80%. Eye box uniformity for each of the cases is 100% for the best gradient, 45% for the linear gradient, and 7% for no gradient. If both a redirection holographic layer and an extraction holographic layer are used resulting in two-dimensional pupil expansion, the eye box uniformity is squared. Thus, the eye box uniformity values become 100% for the best gradient, 20% for the linear gradient, and 0.5% for no gradient.

Using equation (4), the energy that is left in the optical waveguide system at the end of the extraction holographic layer can also be determined. This energy is lost and reduces the overall efficiency of the optical waveguide system. The lost energy in the different cases is 2.4% for the best gradient, 14.7% for the linear gradient, and 6% for no gradient. Thus, the best gradient results in the best efficiency for the optical waveguide system. In addition, the energy lost may be reduced to 0% by using the best gradient with a maximum diffraction efficiency of 100%.

Figure 5:
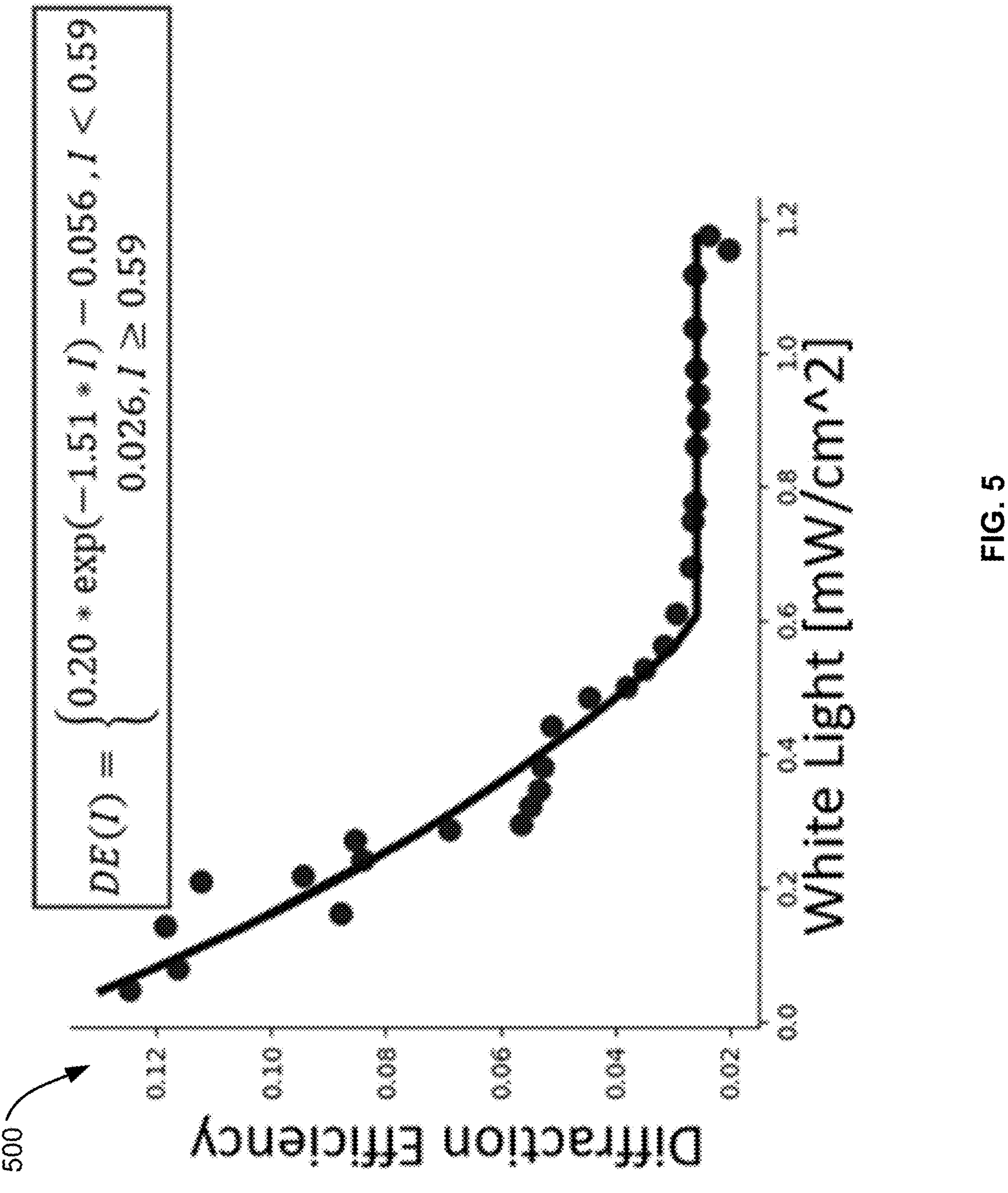
FIG. 5 illustrates a plot of diffraction efficiency relative white light intensity in accordance with an embodiment of the disclosure.

FIG. 5 illustrates a plot 500 of diffraction efficiency relative white light intensity in accordance with an embodiment of the disclosure. There are different possible techniques to vary the diffraction efficiency of a holographic layer by implementing a diffraction efficiency gradient in the holographic layer, which depend on the type of holographic layer. For instance, the holographic layer may be a surface relief grating (SRG) or a volume holographic optical element (VHOE).

For an SRG, diffraction efficiency can be controlled by changing the height of the structure that forms the diffraction grating (e.g., the height of a grating element, such as the height of a tooth). The height can be set by using an etching technique (e.g., a laser-based etching technique).

For a VHOE, the diffraction efficiency is proportional to the index modulation ($\Delta n$) recorded inside the material, according to $n \propto \sin^2(\Delta n)$ for transmission holograms, and $\eta n \propto \tan h^2(\Delta n)$ for reflection holograms. This modulation can be reduced from its maximum by controlling the exposure energy, changing the intensity ratio and/or profile between the recording beams, or by pre-illuminating a photopolymer material in which the holographic layer is formed with incoherent light (e.g., by means of incoherent light illumination from a light source). Out of these three techniques, pre-illumination is preferred considering that the material has a highly non-linear response to exposure energy, and the diffraction efficiency is difficult to control accurately using this method. Changing the intensity ratio between the recording beams may be avoided because a scattering hologram that reduces the contrast of the diffracted beam may be generated.

Pre-illumination of the photopolymer material can reduce the available index modulation by consuming some of the sensitizer molecules that are available during the holographic recording. However, the effect of the pre-illumination is also impacted by the time between the illumination and the recording. To gain better control over the modulation, and avoid repeatability issue, incoherent light illumination can also be done during holographic recording.

Referring to FIG. 5, plot 500 presents a measurement of the diffraction efficiency of a VHOE according to the incoherent light intensity. The VHOE is recorded in a photopolymer film. In an example, the photopolymer film may be made of Covestro Bayfold®, which has a sensitivity of ten mJ per $cm^2$ and is easy to post process by simple ultraviolet (UV) light exposure. Dichromated gelatin (DCG) is another material that can achieve a high index modulation and is robust to the environment once encapsulated. Recording may be done at 532 nm with eight $mW/cm^2$ per beam for a duration of six seconds. One beam is orthogonal to the surface, and the other beam is incident at forty-five degrees. The incoherent light gradient is established using a white light emitting diode (LED) and a spatially varying optical density filter.

The plot 500 includes a piecewise exponential curve fit that is used because any white light irradiance above 0.59 $mW/cm^2$ yields the same diffraction efficiency. So, the varying diffraction efficiency of a VHOE can be set during the recording of the VHOE in the photopolymer film by varying the light intensity of a recording light source. The value of the light intensity for a region of the VHOE can be based on the location of the region within the VHOE and a maximum efficiency of the optical waveguide substrate.

Figure 6:
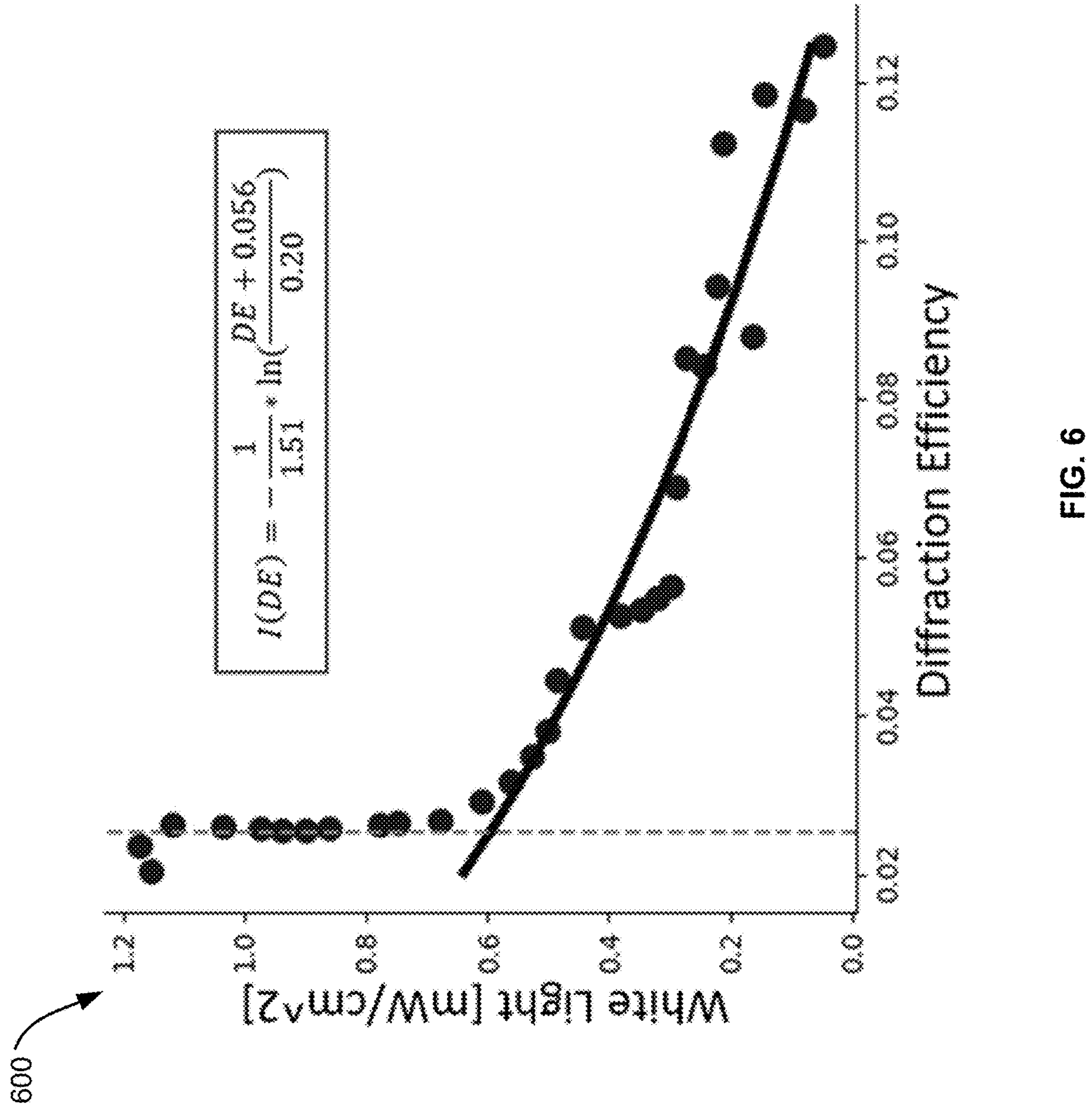
FIG. 6 illustrates a plot of white light intensity relative diffraction efficiency in accordance with an embodiment of the disclosure.

FIG. 6 illustrates a plot 600 of white light intensity relative diffraction efficiency in accordance with an embodiment of the disclosure. The plot 600 represents the inverse of plot 500 in FIG. 5. The inverse of the exponential curve fit in FIG. 5 is taken to give a logarithmic curve fit for the inverse function. The axes orientation of the curve in FIG. 5 may be more natural for curve-fitting but is more natural in FIG. 6 for generating the white light intensity profile. The flat portion of the piecewise function can be dropped to make implementation easier since the white light irradiance does not matter for diffraction efficiency less than 0.026 (dashed line) as long as the white light is greater than 0.59 $mW/cm^2$.

Figure 7:
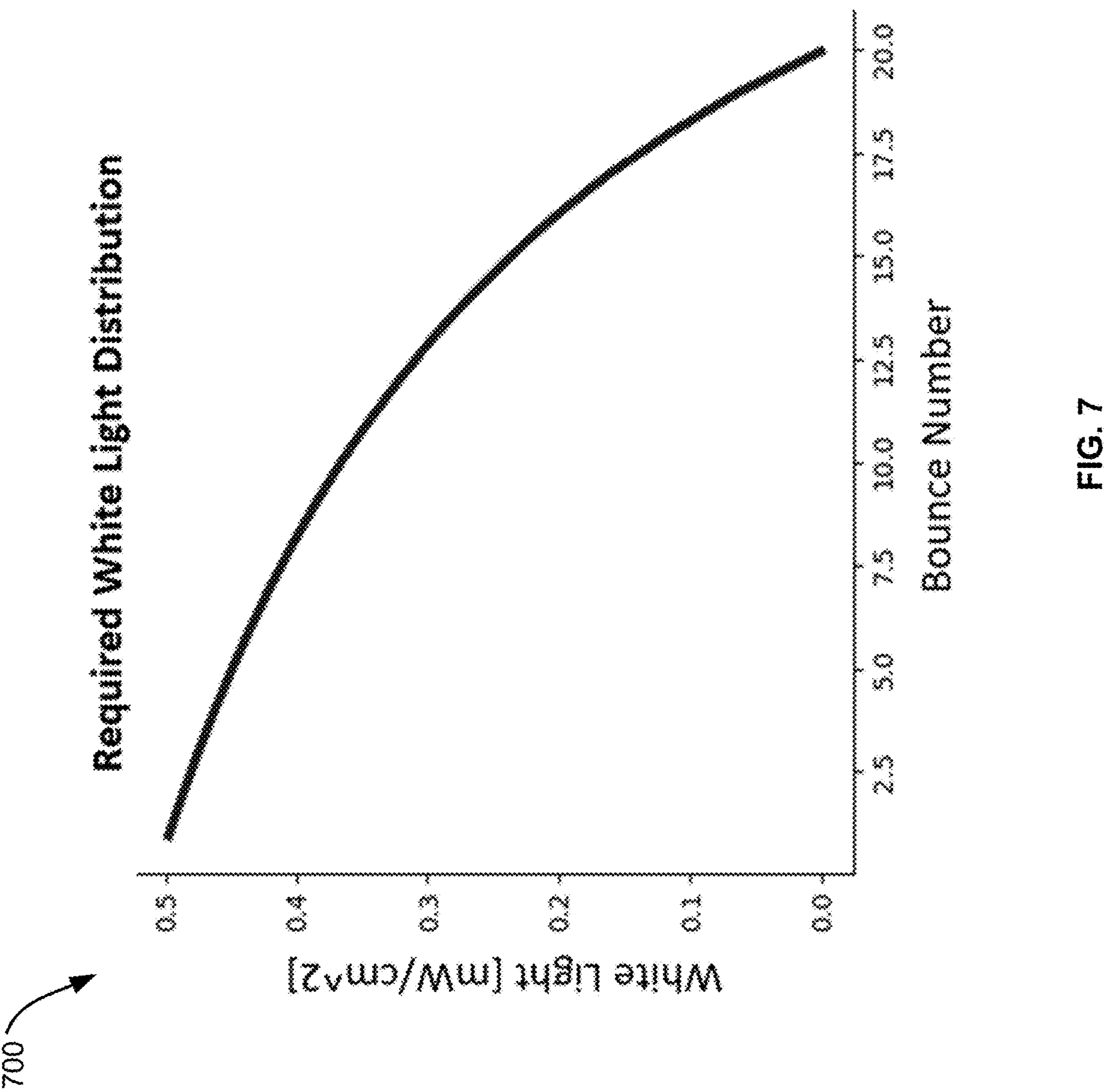
FIG. 7 illustrates a plot of required white light distribution for a holographic layer in accordance with an embodiment of the disclosure.

FIG. 7 illustrates a plot 700 of required white light distribution for a holographic layer in accordance with an embodiment of the disclosure. Under the hologram recording conditions in FIG. 5, there is a maximum achievable diffraction efficiency of 14.36%. This value can be inserted into equation 9 to give the required diffraction efficiency profile. This profile can then be inserted into the logarithmic curve fit to generate the required white light distribution profile as a function of the bounce number along the holographic layer, as shown in FIG. 7. Plot 700 illustrates that as the number of bounces increases, the required white light decreases.

Referring back to FIGS. 3 and 5-7, the width of a holographic layer (e.g., distance between the first and last extraction and/or the number of bounces) can be known a priori. The maximum efficiency of the optical waveguide substrate can also be known a priori. Hence, it is possible to use equation (9) to determine the diffraction efficiency value to use per region (e.g., in term of distance, bounce number or location in the holographic layer). In the case of a VHOE, by knowing the diffraction value for a region, it may be possible to determine the white light intensity to achieve the diffraction value (e.g., as shown in the plot 500, the plot 600). This white light intensity can be correlated to the region locations (e.g., number of bounces or distance) as shown in the plot 700. This correlation can be used to control the light source during the recording.

Also referring back to FIGS. 5-7, particular ranges for the light intensity, diffraction efficiency, and number of bounces are shown. However, the embodiments of the present disclosure are not limited as such. Instead, specific ranges can be defined for any or all of the light intensity, diffraction efficiency, and number of bounces depending on a number of design factors. For example, if the maximum diffraction efficiency of the optical waveguide is a particular value (e.g., 40% instead of 80% as shown in FIG. 3), other correlations between the light intensity, diffraction efficiency, and number of bounces can be derived and used.

A similar approach can be used for SRG etching. In particular, by knowing the diffraction value for a region, it may be possible to determine the height of an SRG element belonging to the region such that this element is etched to have that height.

Figure 8:
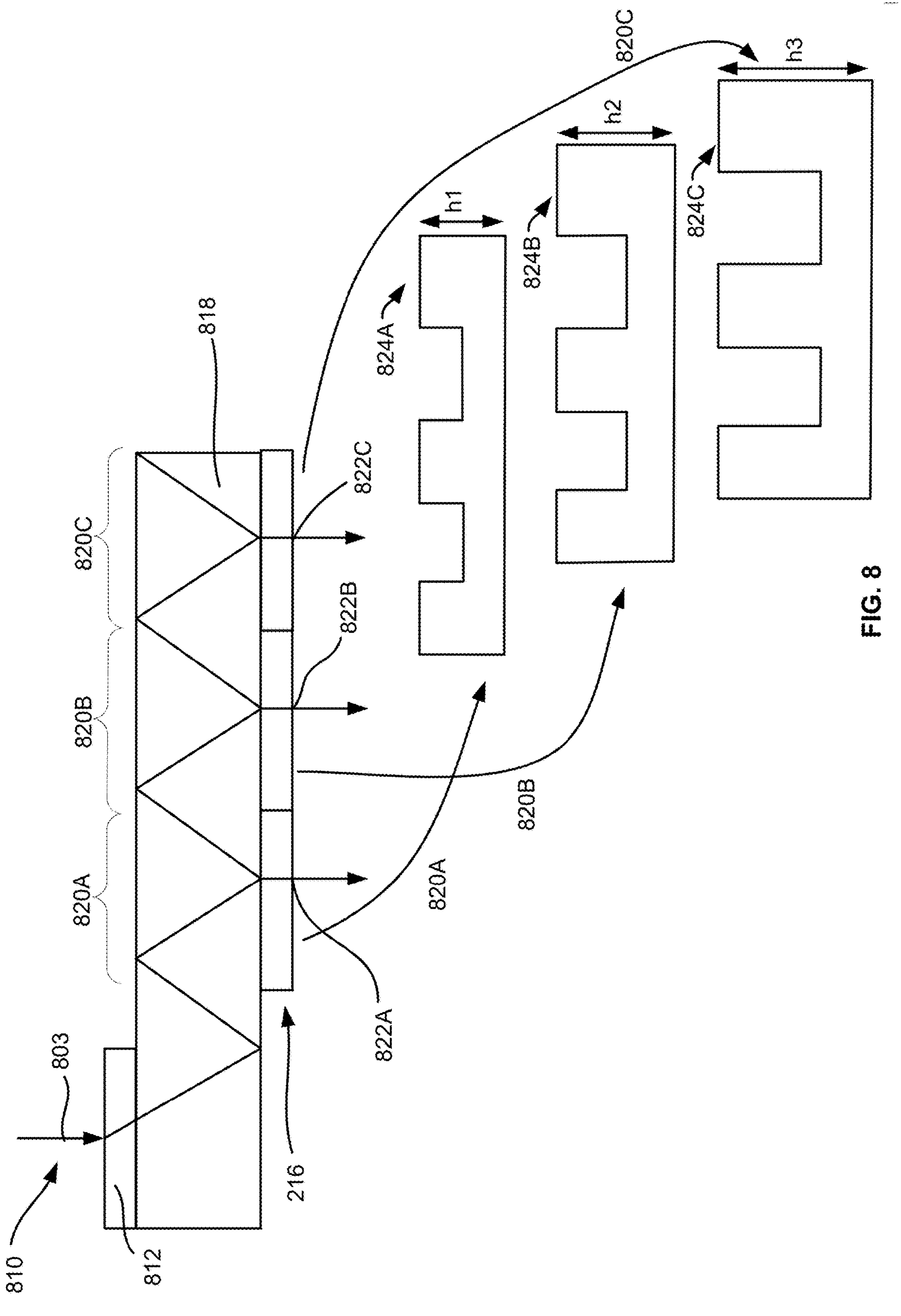
FIG. 8 illustrates an example of an extraction holographic layer of an optical waveguide system including surface relief grating diffraction elements in accordance with an embodiment of the disclosure.

FIG. 8 illustrates an example of an extraction holographic layer 816 of an optical waveguide system 810 including SRG diffraction elements in accordance with an embodiment of the disclosure. The optical waveguide system 810 is an example of the optical waveguide system 110 in FIG. 1. Light 803 is projected towards an injection holographic layer 812 that is coupled to an optical waveguide substrate 818. The injection holographic layer 812 injects the light 803 into the optical waveguide substrate 818, where the injected light propagates by total internal reflection until reaching an extraction holographic layer 816 that is coupled to the optical waveguide substrate 818.

In an example, the extraction holographic layer 816 includes SRG regions 820A-820C, which are each characterized by a diffraction efficiency value. Each of the SRG regions 820A-820C provides a light extraction 822A-822C. The diffraction efficiency of the extraction holographic layer 816 can vary across its output surface such that the extracted light across the extraction holographic layer 816 has a homogeneous intensity. So, each of the SRG regions 820A-820C may be characterized by a different diffraction efficiency. The diffraction efficiency can be constant within an SRG region (e.g., can have the same value across the SRG diffraction elements in the region, whereby these elements have the same height). To achieve this, heights of diffraction elements 824A-824C of the SRG regions 820A-820C may be different from each other. The diffraction elements 824A-824C may be etched in the optical waveguide substrate 818. As illustrated, the diffraction element 824A of the SRG region 820A is etched to have a height (h1) that is shorter than the heights (h2, h3) of the diffraction elements 824B-824C of the SRG regions 820B-820C. The height (h1) can be the same for all diffraction elements within the region 822A. The diffraction element 824B is etched to have a height (h2) that is shorter than the height (h3) that is etched for the diffraction element 824C. The height (h2) can be the same for all diffraction elements within the region 822B. Similarly, the height (h3) can be the same for all diffraction elements within the region 822C. The diffraction efficiency values, and thus the heights of the diffraction elements 824A-824C, can be based on a location of the SRG regions 820A-820C within the extraction holographic layer 816 and on a maximum diffraction efficiency of the optical waveguide substrate 818. In FIG. 8, the height of the diffraction element 824A-824C increases the further away it is from the extraction site 822A. This increase can be non-linear and defined according to equation (9).

Figure 9:
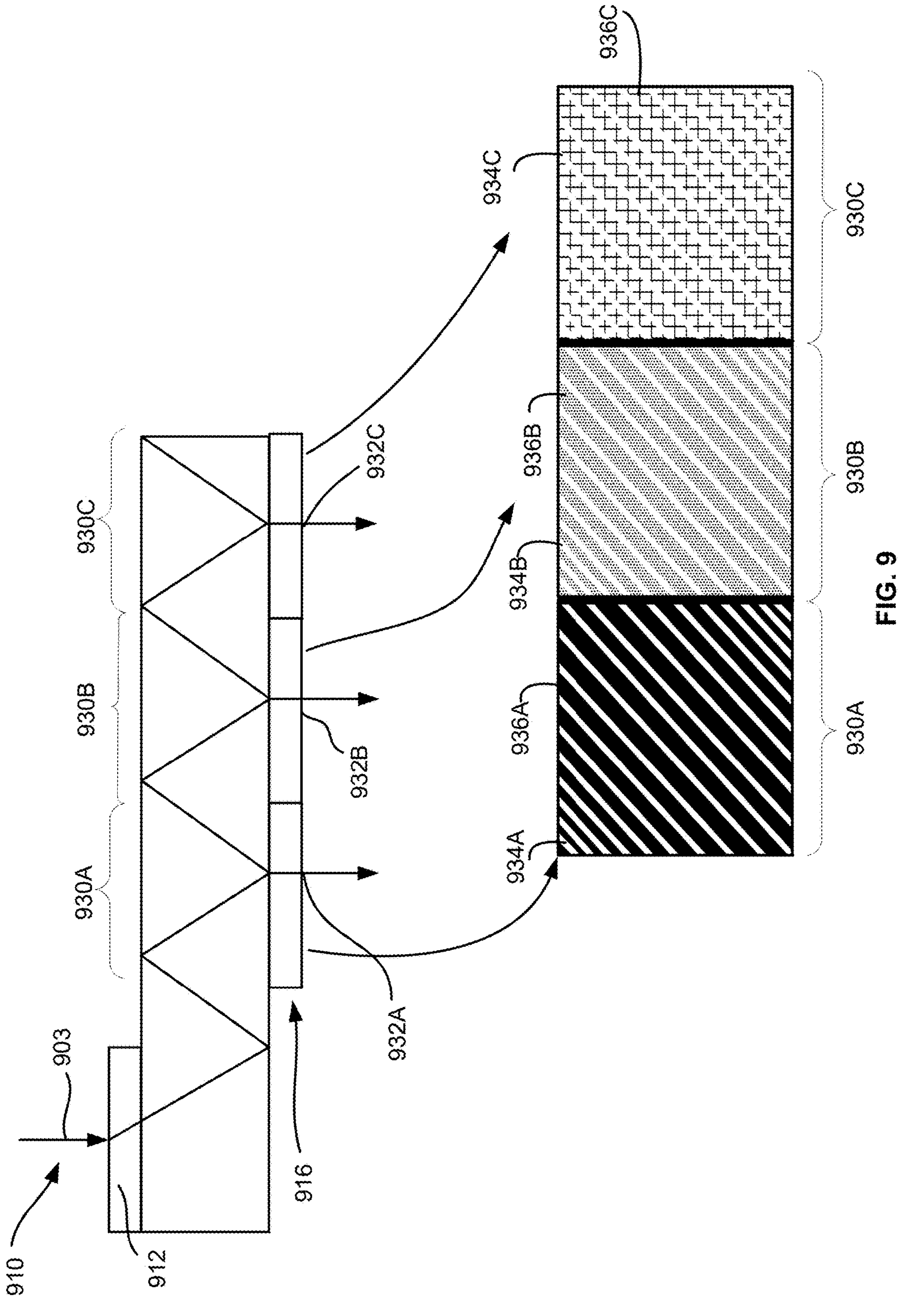
FIG. 9 illustrates an example of an extraction holographic layer of an optical waveguide system 910 including volume holographic optical element regions in accordance with an embodiment of the disclosure.

FIG. 9 illustrates an example of an extraction holographic layer 916 of an optical waveguide system 910 including VHOE regions 930A-930C in accordance with an embodiment of the disclosure. The optical waveguide system 910 is an example of the optical waveguide system 110 in FIG. 1. Light 903 is projected towards an injection holographic layer 912 that is coupled to an optical waveguide substrate 918. The injection holographic layer 912 injects the light 903 into the optical waveguide substrate 918, where the injected light propagates by total internal reflection until reaching an extraction holographic layer 916 that is coupled to the optical waveguide substrate 918.

In an example, the extraction holographic layer 916 includes the VHOE regions 930A-930C, which are each characterized by a diffraction efficiency value. Each of the VHOE regions 930A-930C provides a light extraction site 932A-932C. The diffraction efficiency of the extraction holographic layer 916 can vary across its output surface such that the extracted light has a homogeneous intensity. So, each of the VHOE regions 930A-930C may be characterized by a different diffraction efficiency. The diffraction efficiency can be constant within a VHOE region (e.g., can have the same value across the VHOE region, where the modulation index can be the same within the VHOE region). To achieve this, a modulation index of each of the VHOE regions 930A-930C may be different. The modulation index for each of the VHOE regions 930A-930C can be based on a location of the VHOE region within the extraction holographic layer and on a maximum diffraction efficiency of the waveguide substrate.

As shown in FIG. 9, each of the VHOE regions 930A-930C includes a set of high refractive index region 934 and a set of low refractive index region 936. In FIG. 9, the first VHOE region 930A includes a set of high refractive index regions 934A and a set of low refractive index regions 936A forming a pattern. The refractive index may not change across the high refractive index regions 934A. Similarly, the refractive index may not change across the low refractive index regions 936A but is different than that of the high refractive regions 934A. Likewise, the second VHOE region 930B includes a set of high refractive index regions 934B and a set of low refractive index regions 936B forming a pattern. The refractive index may not change across the high refractive index regions 934B but is different than that of the high refractive index regions 934A of the first VHOE region 930A. Similarly, the refractive index may not change across the low refractive index regions 936B but is different than that of the high refractive regions 934B and is different than that of the low refractive index regions 936A of the first VHOE region 930A. Likewise, the third VHOE region 930C includes a set of high refractive index regions 934C and a set of low refractive index regions 936C forming a pattern. The refractive index may not change across the high refractive index regions 934C but is different than that of the high refractive index regions 934A of the first VHOE region 930A and is different than that of the high refractive index regions 934B of the second VHOE region 930B. Similarly, the refractive index may not change across the low refractive index regions 936C but is different than that of the high refractive regions 934C, is different than that of the low refractive index regions 936A of the first VHOE region 930A and is different than that of the low refractive index regions 936B of the second VHOE region 930B.

Figure 10:
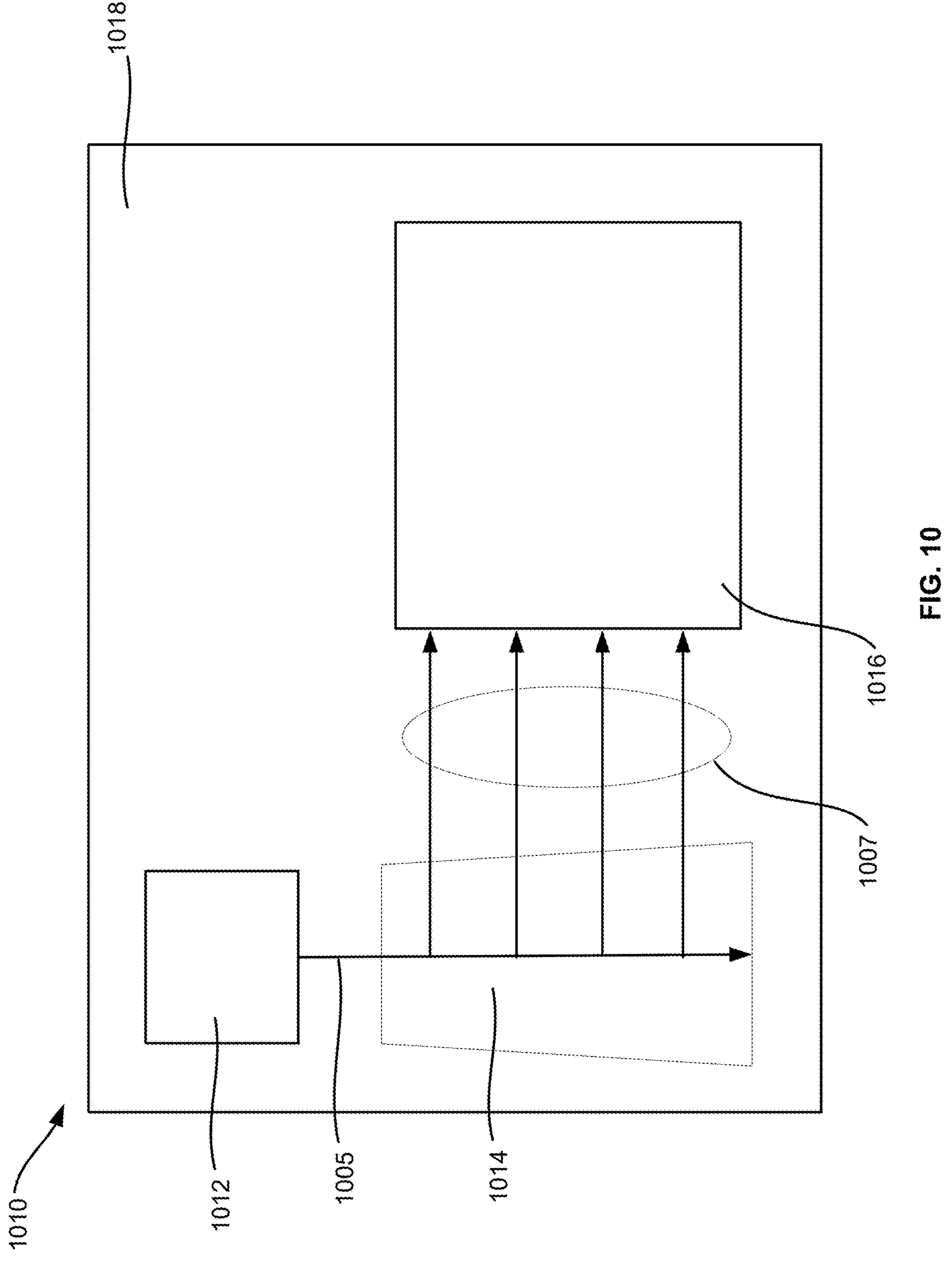
FIG. 10 illustrates two-dimensional pupil expansion with homogenous light intensity in accordance with an embodiment of the disclosure.

FIG. 10 illustrates two-dimensional pupil expansion with homogenous light intensity in accordance with an embodiment of the disclosure. An optical waveguide system 1010, which is an example of the optical waveguide system 110 in FIG. 1, includes an optical waveguide substrate 1018 coupled to an injection holographic layer 1012, a redirection holographic layer 1014, and an extraction holographic layer 1016. The injection holographic layer 1012 receives light projected from a light source and injects the light into the optical waveguide substrate as injected light 1005.

In an example, the redirection holographic layer 1014 receives the injected light 1005 and redirects the injected light 1005 as redirected light rays 1007 propagating in a direction (e.g., x direction). The diffraction efficiency of the redirection holographic layer 1014 can vary across its output surface such that the redirected light rays 1007 have a homogenous intensity at a first distance from the redirection holographic layer 1014 (e.g., at an output surface thereof or at a few centimeters away from such an output surface). For instance, the redirection holographic layer 1014 may include multiple regions that are each characterized by a different diffraction efficiency value based on their location among the regions and on a maximum efficiency of the optical waveguide substrate 1018. The diffraction efficiency values can be preset by using equation (9), where these values are used as part of controlling the recording of the holographic layer as described in FIGS. 3-7. Once the redirection holographic layer 1014 redirects the injected light 1005 as the redirected light rays 1007, the extraction holographic layer 1016 can receive the redirected light rays 1007 and extract the redirected light rays 1007 as extracted light rays in another direction (e.g., y direction).

Figure 11:
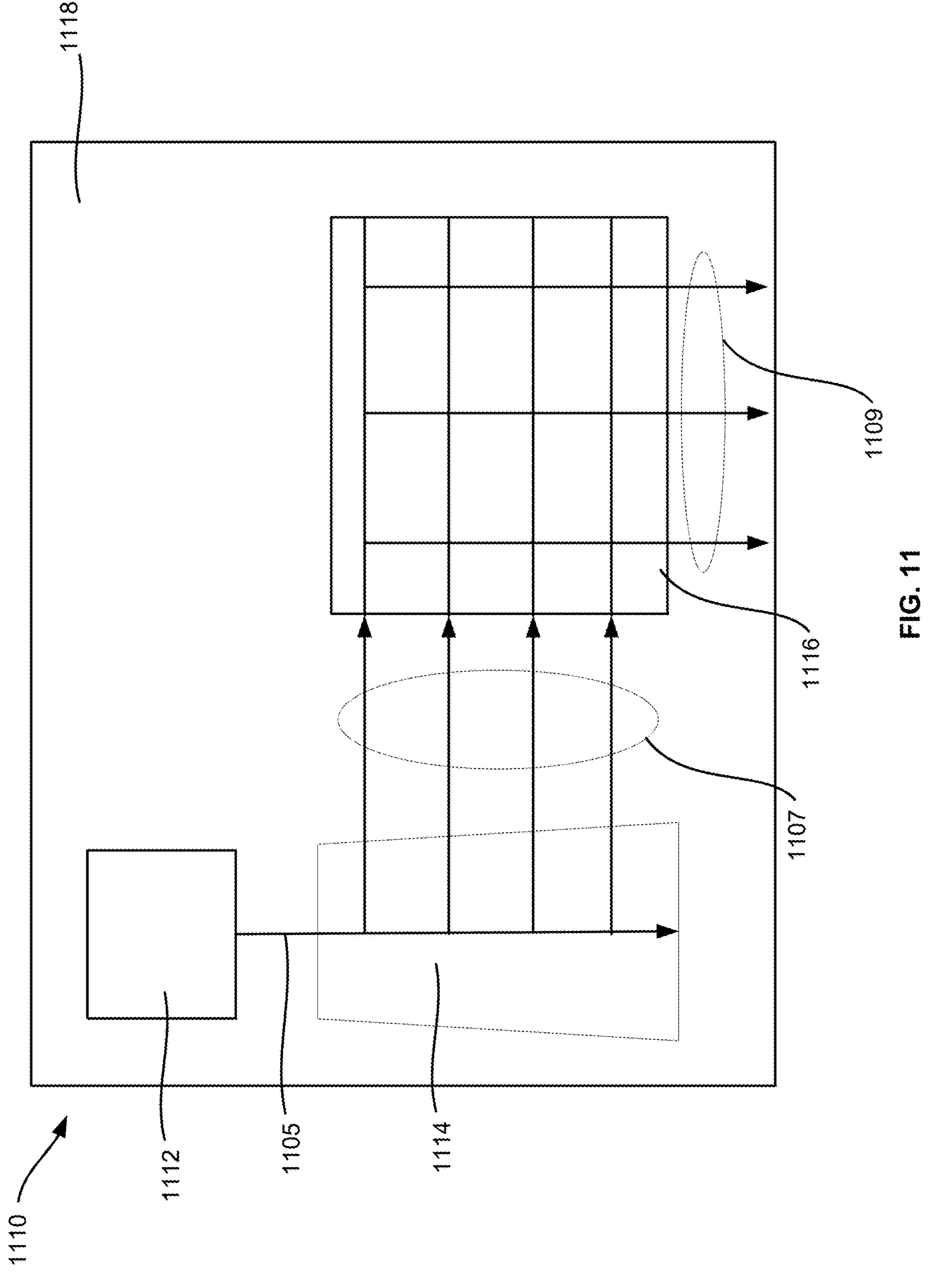
FIG. 11 illustrates two-dimensional pupil expansion with homogenous light intensity in accordance with an embodiment of the disclosure.

FIG. 11 illustrates two-dimensional pupil expansion with homogenous light intensity in accordance with an embodiment of the disclosure. An optical waveguide system 1110, which is an example of the optical waveguide system 110 in FIG. 1, includes an optical waveguide substrate 1118 coupled to an injection holographic layer 1112, a redirection holographic layer 1114, and an extraction holographic layer 1116. The injection holographic layer 1112 receives light projected from a light source and injects the light into the optical waveguide substrate as injected light 1105.

In an example, the redirection holographic layer 1114 receives the injected light 1105 and redirects the injected light 1105 as redirected light rays 1107 propagating in a first direction (e.g., x direction). The diffraction efficiency of the redirection holographic layer 1114 can vary across its output surface such that the redirected light rays 1107 have a homogenous intensity at a first distance from the redirection holographic layer 1114 (e.g., at an output surface thereof or at a few centimeters away from such an output surface). For instance, the redirection holographic layer 1114 may include multiple regions that are each characterized by a different diffraction efficiency value based on their location among the regions and on a maximum efficiency of the optical waveguide substrate 1118. The diffraction efficiency values can be determined by using equation 9.

Once the redirection holographic layer 1114 redirects the injected light 1105 as the redirected light rays 1107, the extraction holographic layer 1116 can receive the redirected light rays 1107 and extract the redirected light rays 1107 as extracted light rays 1009 propagating in a second direction (e.g., y direction). The diffraction efficiency of the extraction holographic layer 1116 can vary across its output surface such that the extracted light rays 1107 have a homogenous intensity at a second distance from the extraction holographic layer 1116 (e.g., at an output surface thereof or at a few centimeters away from such an output surface). For instance, the extraction holographic layer 1116 may also include multiple regions that are each characterized by a different diffraction efficiency value based on their location among the regions and on a maximum efficiency of the optical waveguide substrate 1118. The diffraction efficiency values can be preset by using equation (9), where these values are used as part of controlling the recording of the holographic layer as described in FIGS. 3-7. The extraction holographic layer 1116 can form an eye box and each region can correspond to a pupil location to view an image within the eye box. Based on the varied diffraction efficiency values, a brightness of the image in luminosity can be homogenous across the eye box.

Figure 12:
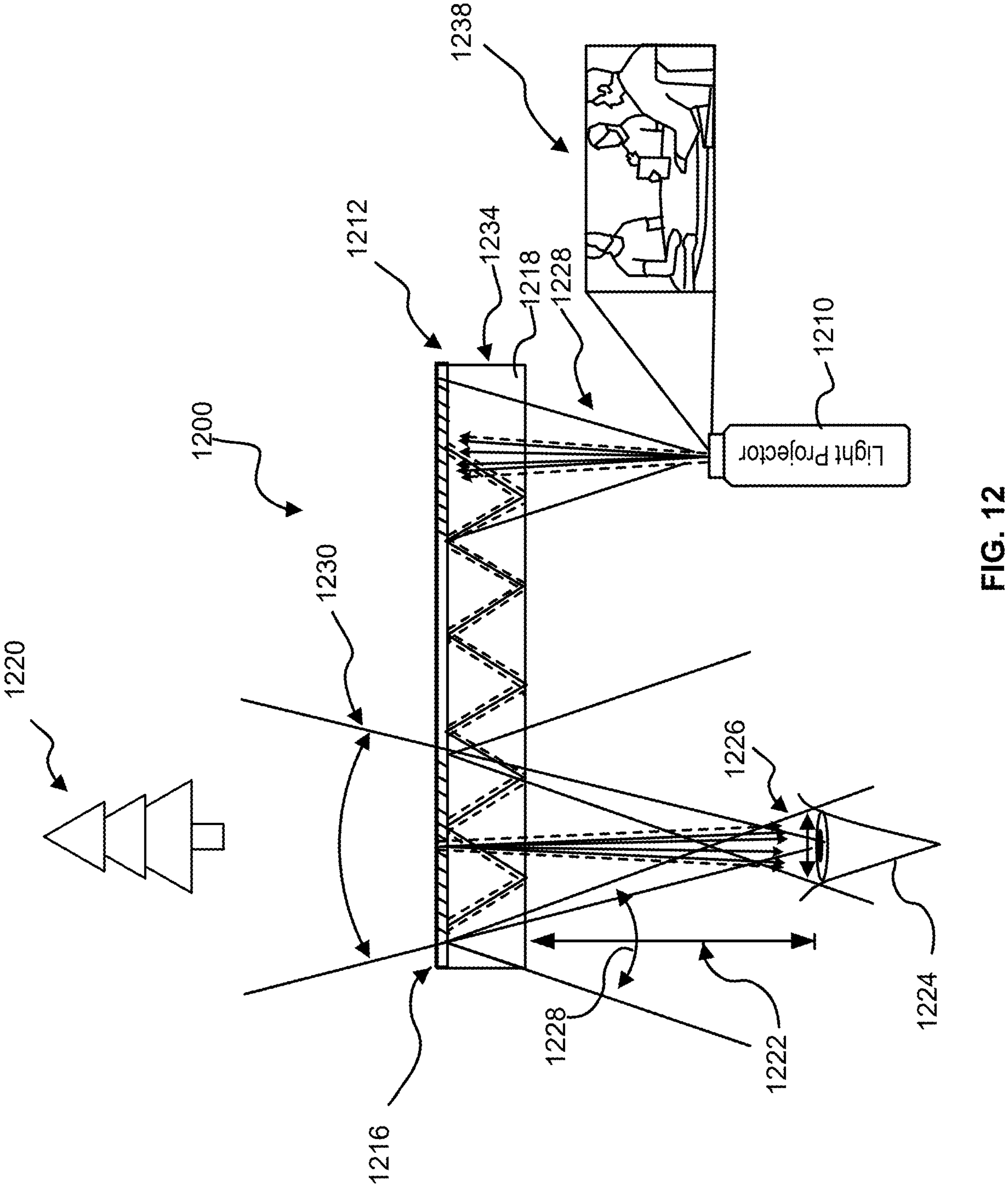
FIG. 12 illustrates a schematic of a system of a waveguide combiner in accordance with an embodiment of the present disclosure.

FIG. 12 illustrates a schematic of a system of an optical lens set and image combiner in accordance with an embodiment of the present disclosure. An optical system 1200 can be used in mixed reality display, such as a heads-up display or an augmented reality display. The optical system 1200 includes an optical combiner 1234. Pupil replication decouples the pupil size from the field of view, which are otherwise inversely linked in other types of mixed reality systems. This advantage means that the optical combiner based displays can offer a large eye box together with a large image field of view. In an example, the optical combiner 1234 may be a waveguide optical combiner. Nonetheless, other optical combiner types are possible, such as a holographic optical element-based combiner, or any other suitable optical combiner, in other examples.

Pupil replication in the optical combiner 1234 can be obtained when the image that is propagating inside the optical combiner 1234 is only partially extracted (or redirected) by the optical combiner 1234. When this happens, the remainder of the light keeps propagating in its original direction inside the optical combiner 1234. The remaining light bounces on the outer surface of the optical combiner 1234 and then interacts again with the holographic optical element, where another portion is extracted (or redirected). Successive extractions of the light replicate the pupil multiple times.

The optical combiner 1234 can be built using waveguide holography. This technique uses an injection hologram 1212 to trap auxiliary content 1238 (e.g., projector-emitted light representing virtual images) inside a substrate 1218 through TIR. The auxiliary content 1238 can be generated by a light projector 1210 (e.g., a light engine configured as a light source). In the substrate 1218, the auxiliary content 1238 propagates away from the light projector 1210 and is outcoupled toward a viewer's eye 1224 by an extraction hologram 1216. The extraction hologram 1216 can be characterized by a varying diffraction efficiency such that output light rays extracted by the extraction hologram 1216 have a homogenous intensity. A hologram represents a functional diffractive structure that transforms the waveform of the input beam into an output beam. A VHOE is a type of hologram that operates in the Bragg diffraction regime. The optical combiner 1234 represents the optical elements in the optical path from the exit aperture of the light projector 1210 to the plane where light enters the viewer's eye 1224. Both the injection hologram 1212 and the extraction hologram 1216 are transparent across the entire or a predefined visible range except for a percent reduction (depending on different parameters such as the type materials used, thickness, etc.) in transmission across the bandwidth of the broadband red-green-blue (RGB) light sources. This allows the viewer to see real imagery 1220 and the auxiliary content 1238. The light projector 1210 and the extraction hologram 1216 emit within a cone of light 1228.

Although FIG. 12 illustrates the injection hologram 1212 and the extraction hologram 1216 to be on a same side of the substrate 1218, embodiments of the present disclosure are not limited as such. For instance, the injection hologram 1212 and the extraction hologram 1216 can be on opposite sides of the substrate 1218. Generally, the injection hologram 1212 is coupled to an input surface of the substrate 1218 by, for instance, being mounted to and attached to the input surface. Likewise, the extraction hologram 1216 is coupled to an output surface of the substrate 1218 by, for instance, being mounted to and attached to the output surface. The input surface corresponds to a surface where light from the light projector 1210 is received. The output surface corresponds to a surface from which light is emitted from the substrate 1218.

The optical combiner 1234 can form the eye box 1226 in the horizontal and vertical directions. The eye box 1226 can correspond to the vertical and horizontal distance where the viewer's pupil receives all the angles emitted by the light projector 1210. As the viewer's pupil moves outside the eye box 1226, the image becomes degraded. Eye relief 1222 is the distance between the substrate surface and the entrance pupil of the viewer's eye 1224. For maximum comfort, this distance should be larger than a minimum threshold distance. The field-of-view 1230 is the angular size of the image determined by the geometric relationship between the size of the extraction hologram 1216 and the distance between the pupil and the surface of the extraction hologram 1216.

Waveguide combiners using holographic optical elements can operate in either a transmission mode where the light is diffracted as it passes through the holographic optical element or in a reflection mode where the light is diffracted and returns in the opposite direction after striking the holographic optical element. Such waveguide combiners can be used in near-to-eye (NTE) systems to achieve a particular field of view. Field of view angles can be measured in air and acceptance angles for reflection volume holographic optical element are measured inside the substrate. The relationship between the air and substrate angles is described by Snell's law.

Holographic optical elements operating in reflection mode can be volume holographic optical elements. A reflection volume holographic optical element is capable of incoupling into substrate modes (light propagating through total internal reflection).

A properly designed optical combiner 1234 can have a high transmission (e.g., at least 80%) of the light from the real imagery 1220, a large auxiliary field of view diagonally, vertically and horizontally, a large eye box, and an ability to accept the auxiliary content 1238 from broadband light emitting diode RGB inputs. To build such an optical waveguide combiner, several issues can be addressed.

Light projectors are designed to achieve a certain white balance (the ratio between the primary emission wavelengths that provide a natural looking image-white balance is typically expressed in degrees Kelvin of a black body source producing the same spectral distribution). The optical combiner 1234 maintains the white balance of the light projector 1210 along the optical path to the viewer's eye 1224.

While either transmission or reflection holographic optical element can be implemented in the display to produce a large field of view, reflection holographic optical elements can provide a large horizontal field of view. Transmission holographic optical elements can be used in the optical combiner 1234 when the angular requirements on the field of views are smaller. Both horizontal and vertical field of views can be limited by the distance from the aperture stop of the light projector 1210 to the center of the extraction hologram 1216. In order for NTE glasses to accommodate size, weight, and power restrictions, the size of the light projector 1210 should be as small as possible. In some designs, this makes the size of the aperture stop (pupil) as small as five mm in diameter in relation to the desired vertical field of view. In this case, the limitation on vertical field of view can become significant and would need to be expanded. Pupil expansion in the horizontal direction is naturally provided by the waveguide geometry of the optical combiner 1234. This is because the light forming the image experiences multiple bounces in the direction of the extraction hologram 1216 and multiple light extractions can expand the eye box 1226. In particular, a portion of the light can be extracted and output by each of the diffraction gratings of the extraction hologram 1216.

The arrangement of components of the optical system 1200 is provided for illustrative purposes. Different possible of such components are possible. For example, the eye box 1226 can be centered, positioned near center, or positioned at a particular distance from the center of the optical combiner 1234.

Figure 13:
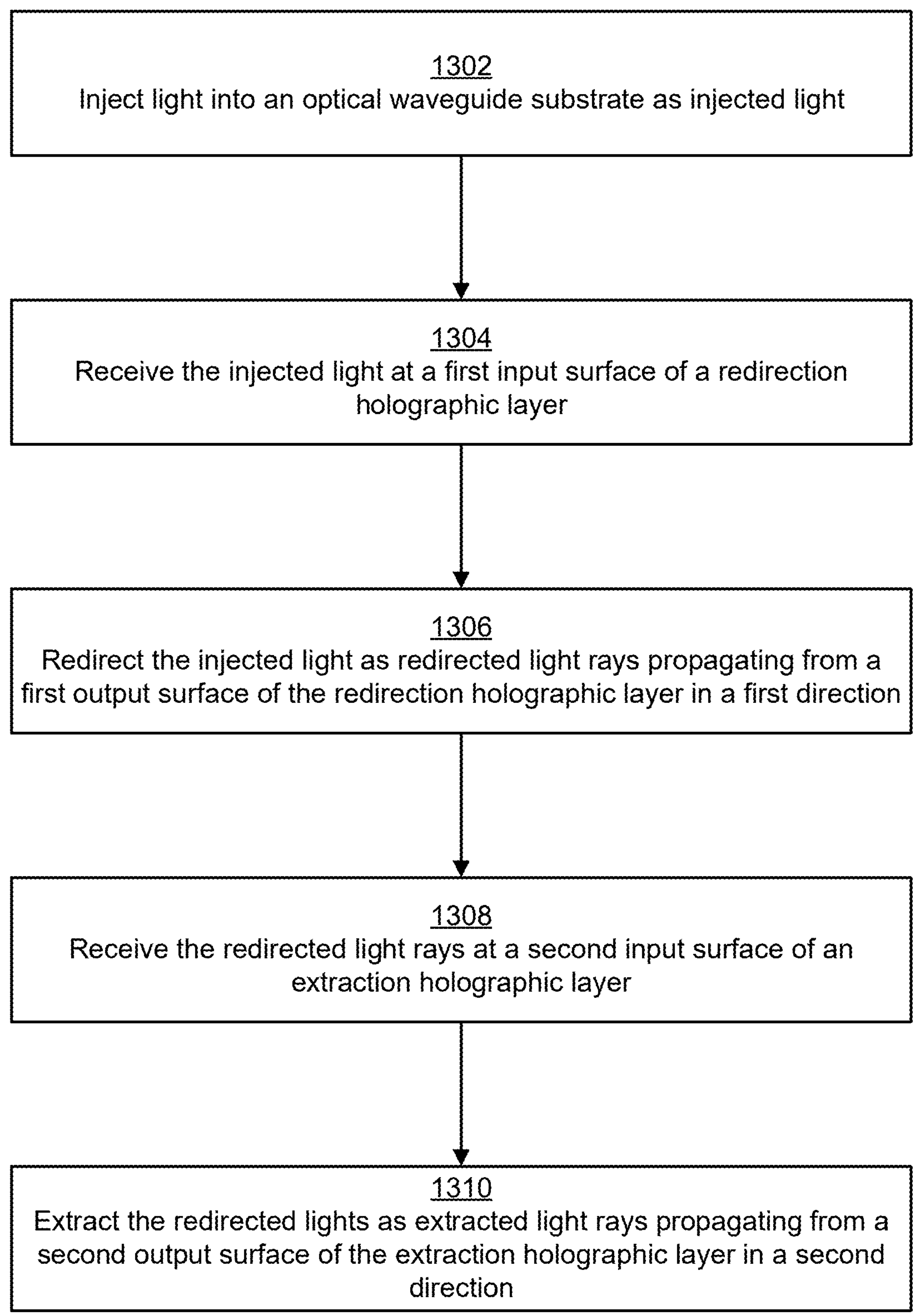
FIG. 13 illustrates an example flow for light propagation of an optical waveguide system in accordance with an embodiment of the disclosure.

FIG. 13 illustrates an example flow for light propagation of an optical waveguide system in accordance with an embodiment of the disclosure. An optical waveguide system (e.g., optical waveguide system 110 in FIG. 1) is described as performing the operations of the example flow. While the operations are illustrated in a particular order, it should be understood that no particular order.

In an example, the flow includes operation 1302, where the optical waveguide system injects light into an optical waveguide substrate as injected light. An injection holographic layer can receive the light from a light source and inject the light into the optical waveguide substrate.

In an example, the flow includes operation 1304, where the optical waveguide system receives the injected light at a first input surface of a redirection holographic layer. The redirection holographic layer is coupled to the optical waveguide substrate. The injected light can propagate by total internal reflection until it reaches the first input surface.

In an example, the flow includes operation 1306, where the optical waveguide system redirects the injected light as redirected light rays propagating from a first output surface of the redirection holographic layer in a first direction. The redirection holographic layer can be characterized by a diffraction efficiency that varies across the first output surface. For instance, the redirection holographic layer may include regions that are each characterized by different diffraction efficiency values based on their location among the regions and a maximum efficiency of the optical waveguide substrate. As an example, the diffraction efficiency values may be higher for regions that are further from a first region or that have a higher number of bounces of the injected light. The diffraction efficiency values can be preset by using equation (9), where these values are used as part of controlling the recording of the holographic layer as described in FIGS. 3-7. So, the redirected light rays can have a first homogenous intensity.

In an example, the flow includes operation 1308, where the optical waveguide system receives the redirected light rays at a second input surface of an extraction holographic layer. The extraction holographic layer is coupled to the optical waveguide substrate. The redirected light rays can propagate by total internal reflection until reaching the second input surface.

In an example, the flow includes operation 1310, where the optical waveguide system extracts the redirected light rays as extracted light rays propagating from a second output surface of the redirection holographic layer in a second direction. The extraction holographic layer can be characterized by a diffraction efficiency that varies across the second output surface. For instance, the extraction holographic layer may include regions (e.g., SRG regions or VHOE regions) that are each characterized by different diffraction efficiency values based on their location among the regions and a maximum efficiency of the optical waveguide substrate. As an example, the diffraction efficiency values may be higher for regions that are further from a first region or that have a higher number of bounces of the redirected light rays. The diffraction efficiency values can be preset by using equation (9), where these values are used as part of controlling the recording of the holographic layer as described in FIGS. 3-7. So, the extracted light rays can have a second homogenous intensity.

Figure 14:
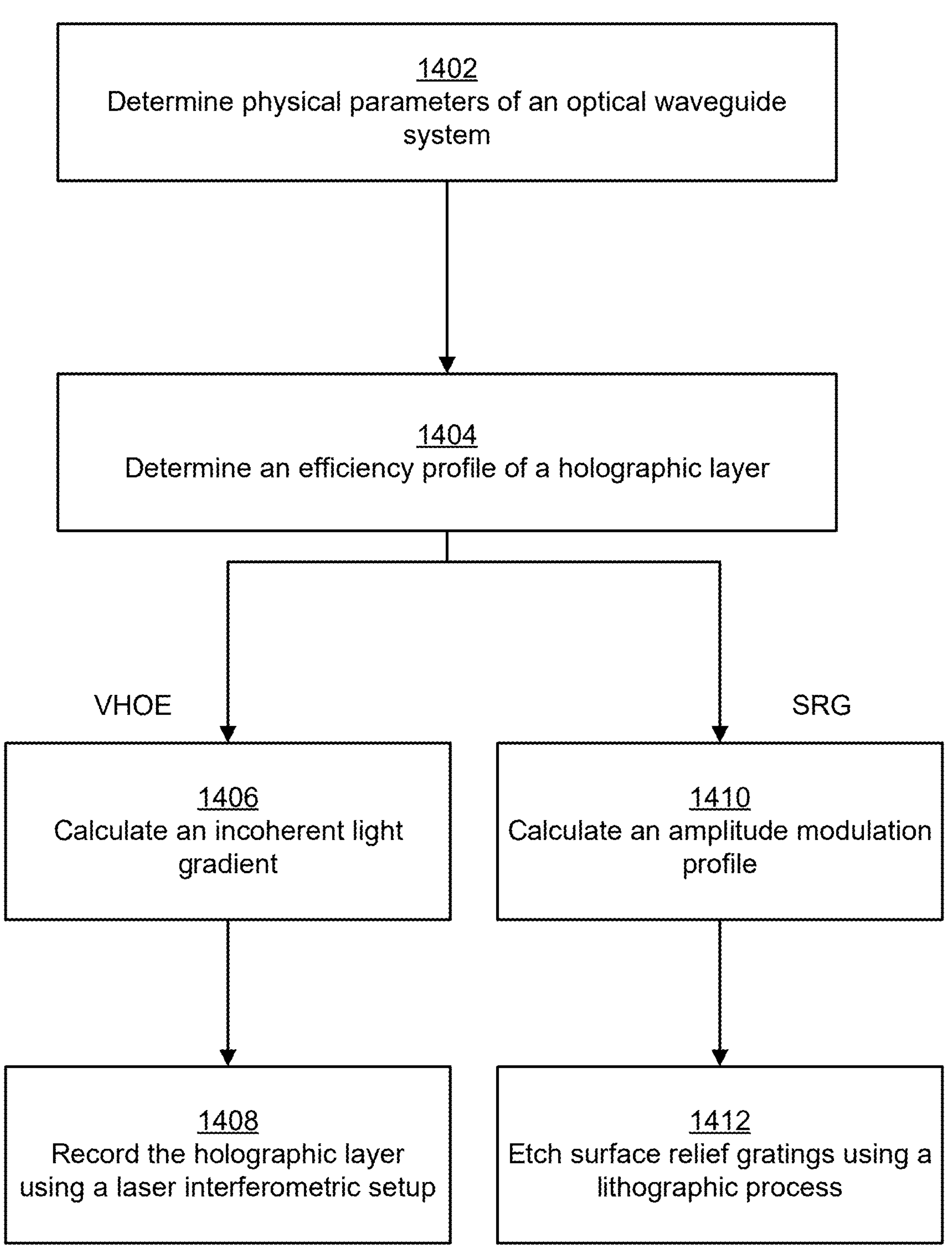
FIG. 14 illustrates an example flow for producing a holographic layer for homogenous light intensity output in accordance with an embodiment of the disclosure.

FIG. 14 illustrates an example flow for producing a holographic layer for homogenous light intensity output in accordance with an embodiment of the disclosure. In an example, the flow includes operation 1402, where physical parameters of the optical waveguide system are determined. The physical parameters can include a light propagation geometry (e.g., one-dimensional or two-dimensional), a holographic layer length, a number of bounces for the holographic layer, and a maximum efficiency of an optical waveguide substrate.

In an example, the flow includes operation 1404, where an efficiency profile of a holographic layer is determined. In general, the efficiency profile relates to the diffraction efficiency relative to a distance from a first extraction site of a holographic layer. So, the efficiency profile may be the diffraction efficiency relative to the number of bounces of injected light prior to the light being output (or the distance between the first light extraction to where the current light extraction). The efficiency profile can be determined by using equation (9) and is generally non-linear, with a higher diffraction efficiency for higher numbers of bounces or larger distance, and is dependent on the maximum efficiency of the optical waveguide substrate. If the holographic layer includes VHOE regions, the flow can proceed to operation 1406, and if the holographic layer includes SRG regions, the flow can proceed to operation 410.

In an example, the flow includes operation 1406, where an incoherent light gradient is calculated. The incoherent light gradient may be determined using the efficiency profile and the incoherent light response of the material of the holographic layer. As an example, the incoherent light gradient may be established using a white light emitting diodes and a spatially varying optical density filter.

In an example, the flow includes operation 1408, where the holographic layer is recorded using a laser interferometric setup. So, the varying diffraction efficiency of a holographic layer can be set during the recording of the holographic layer by varying the light intensity of a recording light source according to the incoherent light gradient. The value of the light intensity for a region of the holographic layer can be based on the location of the region within the holographic layer and a maximum diffraction efficiency of the optical waveguide substrate.

In an example, the flow includes operation 1410, where an amplitude modulation profile is calculated. The amplitude modulation profile is determined using the efficiency profile and electromagnetic propagation through the SRG regions. The amplitude modulation profile may indicate that the heights of SRG regions closer to a first extraction site are to be shorter than heights of SRG regions further from the first extraction site so that light of a homogenous intensity is output from the holographic layer.

In an example, the flow includes operation 1412, where SRGs are etched using a lithographic process. Etching the SRGs can result in the amplitude modulation profile being reproduced in the holographic layer. So, a varying diffraction efficiency of the holographic layer can be set based on the etching.

Figure 15:
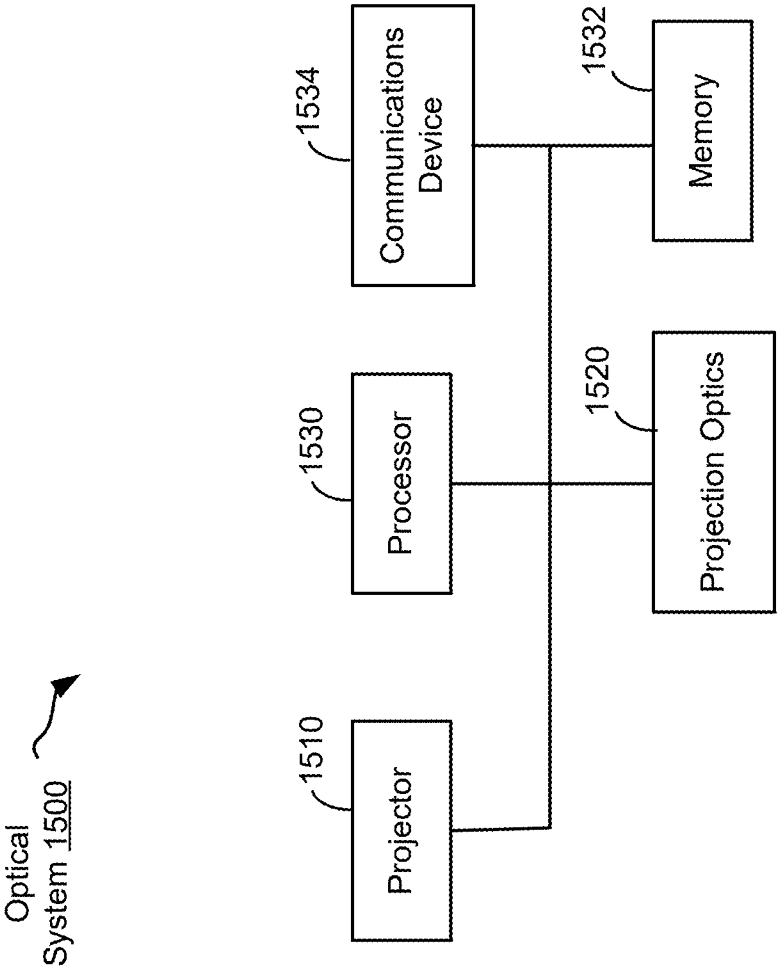
FIG. 15 illustrates a schematic diagram of an optical system in accordance with an embodiment of the present disclosure.

FIG. 15 illustrates a schematic diagram of an optical system 1500 system in accordance with an embodiment of the present disclosure. As illustrated in FIG. 15, the optical system 1500 supports a mixed reality device, such as any of the devices described herein above. In an example, the optical system 1500 includes a projector 1510, which can be implemented as discussed in relation to the light projectors discussed herein above. The optical system 1500 includes an optical waveguide system including holographic layers. The optical system 1500 can also include projection optics 1520 operable to direct light produced using projector 1510.

The optical system 1500 additionally includes a processor 1530 (e.g., a microprocessor), a memory 1532, and a communications device 1534. The memory 1532, also referred to as storage media or non-transitory computer readable storage media, stores computer-readable instructions of an application, where the computer-readable instructions are executable by the processor 1530 to run the application.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or network browser. It should be appreciated that alternate embodiments may have numerous variations from that described above. For example, customized hardware might also be used and/or particular elements might be implemented in hardware, software (including mobile software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a mobile computing device, a device controller, or a computational engine within an appliance, to name a few.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An optical waveguide system comprising:
an optical waveguide substrate characterized by a maximum diffraction efficiency;
a first holographic layer coupled to the optical waveguide substrate and configured to inject light into the optical waveguide substrate; and
a second holographic layer coupled to the optical waveguide substrate and configured to receive the light and output first light rays in a first direction,
wherein:
the second holographic layer includes extraction sites,
the second holographic layer is characterized by a varying diffraction efficiency,
the varying diffraction efficiency at an extraction site of the extraction sites is different from the maximum diffraction efficiency of the optical waveguide substrate and is defined as a function of the maximum diffraction efficiency, and
the first light rays have a homogenous intensity at a first distance from the second holographic layer.

2. The optical waveguide system of claim 1, wherein the second holographic layer includes a plurality of regions, wherein a first region of the plurality of regions is characterized by a first diffraction efficiency value that is based at least in part on a location of the first region and on a maximum efficiency of the optical waveguide substrate.

3. The optical waveguide system of claim 2, wherein the light represents an image, wherein the first region outputs a first duplicate of the image, wherein a second region of the plurality of regions outputs a second duplicate of the image, wherein the first duplicate and the second duplicate have brightness in luminosity.

4. The optical waveguide system of claim 2, wherein a second region of the plurality of regions includes a surface relief grating (SRG) or a volume holographic optical element (VHOE) and is characterized by a second diffraction efficiency value that is different from the first diffraction efficiency value, and wherein the first diffraction efficiency value is constant across the first region.

5. The optical waveguide system of claim 1, wherein a region of the second holographic layer is characterized by a diffraction efficiency value that is based at least in part on a number of bounces of the light due to total internal reflection (TIR) up to the region and on a maximum diffraction efficiency of the optical waveguide substrate.

6. The optical waveguide system of claim 1, wherein the second holographic layer includes a volume holographic optical element (VHOE) recorded in the optical waveguide substrate based at least in part on incoherent light illumination, wherein the varying diffraction efficiency is modulated by the incoherent light illumination.

7. The optical waveguide system of claim 1, wherein a first region of the second holographic layer is characterized by a first diffraction efficiency value, wherein a second region of the second holographic layer is characterized by a second diffraction efficiency value, wherein the second diffraction efficiency value is based at least in part on a distance between the first region and the second region and on a maximum diffraction efficiency of the optical waveguide substrate.

8. The optical waveguide system of claim 7, wherein the second holographic layer defines an eye box, and wherein the second diffraction efficiency value is further based at least in part on a width of the eye box.

9. An apparatus comprising:
a light source configured to emit light; and
an optical waveguide system that is characterized by a maximum diffraction efficiency and that comprises:
an optical waveguide substrate;
a first holographic layer coupled to the optical waveguide substrate and configured to inject the light into the optical waveguide substrate; and
a second holographic layer coupled to the optical waveguide substrate and configured to receive the light and output first lights rays in a first direction,
wherein:
the second holographic layer includes extraction sites,
the second holographic layer is characterized by a varying diffraction efficiency,
the varying diffraction efficiency at an extraction site of the extraction sites is different from the maximum diffraction efficiency of the optical waveguide substrate and is defined as a function of the maximum diffraction efficiency, and
the first light rays have a homogenous intensity at a first distance from the second holographic layer.

10. The apparatus of claim 9, wherein the varying diffraction efficiency and the homogenous intensity, are a first varying diffraction efficiency and a first homogenous intensity, respectively, and wherein the apparatus further comprises:
a third holographic layer coupled to the optical waveguide substrate and configured to receive the first light rays and output second light rays in a second direction,
wherein:
the third holographic layer is characterized by a second diffraction efficiency, and
the second light rays have a second homogenous intensity at a second distance from the third holographic layer.

11. The apparatus of claim 9, wherein a first region of the second holographic layer comprises a first extraction site and is characterized by a first diffraction efficiency value, wherein a second region of the second holographic layer comprises a second extraction site and is characterized by a second diffraction efficiency value, wherein the second diffraction efficiency value is based at least in part on a location of the second extraction site and on the maximum diffraction efficiency of the optical waveguide substrate.

12. The apparatus of claim 11, wherein the varying diffraction efficiency is defined based at least in part on a non-linear function expressed as $$\eta(n) = \frac{1}{\frac{1}{\eta_{max}} + N - n},$$

wherein "n" corresponds to an n-th extraction site, "N" represents the total number of extraction sites, and "$\eta_{max}$" represents the maximum diffraction efficiency.

13. The apparatus of claim 9, wherein the second holographic layer comprises a first region comprising a first surface relief grating (SRG) diffraction element and a second region comprising a second SRG diffraction element, wherein a first height of the first SRG diffraction element is different than a second height of the second SRG diffraction element and is based at least in part on a location of the first region within the second holographic layer and on a maximum diffraction efficiency of the optical waveguide substrate.

14. The apparatus of claim 9, wherein the second holographic layer comprises a first volume holographic optical element (VHOE) region and a second VHOE region, wherein a first refractive index of the first VHOE region is different than a second refractive index of the second VHOE region and is based at least in part on a location of the first VHOE region within the second holographic layer and on a maximum diffraction efficiency of the optical waveguide substrate.

15. The apparatus of claim 9, wherein the second holographic layer is recorded in a photopolymer film, wherein the varying diffraction efficiency is set during a recording of the second holographic layer in the photopolymer film by at least varying light intensity of a recording light source emitting incoherent light, wherein a value of the light intensity for a region of the second holographic layer is based at least in part on a location of the region within the second holographic layer and a maximum diffraction efficiency of the optical waveguide substrate.

16. The apparatus of claim 9, wherein the second holographic layer comprises a plurality of surface relief grating (SRG) diffraction elements etched in the optical waveguide substrate, wherein a first SRG diffraction element is etched to have a height that is based at least in part on a location of the first SRG diffraction element within the second holographic layer and a maximum diffraction efficiency of the optical waveguide substrate.

17. The apparatus of claim 9, wherein the second holographic layer comprises a plurality of regions and forms an eye box, wherein each one of the plurality of regions corresponds to a pupil location to view an image within the eye box, and wherein a brightness of the image in luminosity is homogenous across the eye box.

* * * * *